United States Patent
Richardson

(10) Patent No.: US 11,123,666 B2
(45) Date of Patent: Sep. 21, 2021

(54) FUEL FILTER DEVICE

(71) Applicant: Michael Richardson, Sandusky, OH (US)

(72) Inventor: Michael Richardson, Sandusky, OH (US)

(*) Notice: Subject to any disclaimer, the term of this patent is extended or adjusted under 35 U.S.C. 154(b) by 817 days.

(21) Appl. No.: 15/383,714

(22) Filed: Dec. 19, 2016

(65) Prior Publication Data

US 2017/0095758 A1    Apr. 6, 2017

Related U.S. Application Data

(63) Continuation of application No. 13/965,583, filed on Aug. 13, 2013, now Pat. No. 9,522,353.

(51) Int. Cl.
| | | |
|---|---|---|
| *B01D 35/30* | (2006.01) | |
| *B01D 35/143* | (2006.01) | |
| *B01D 37/04* | (2006.01) | |
| *B01D 36/00* | (2006.01) | |
| *B01D 27/06* | (2006.01) | |
| *B01D 27/08* | (2006.01) | |

(52) U.S. Cl.
CPC .......... *B01D 35/143* (2013.01); *B01D 27/06* (2013.01); *B01D 27/08* (2013.01); *B01D 35/306* (2013.01); *B01D 36/005* (2013.01); *B01D 37/04* (2013.01); *B01D 37/045* (2013.01); *B01D 2201/302* (2013.01); *B01D 2201/52* (2013.01); *B01D 2201/56* (2013.01)

(58) Field of Classification Search
CPC . B01D 35/143; B01D 35/306; B01D 2201/56
See application file for complete search history.

(56) References Cited

U.S. PATENT DOCUMENTS

| | | | |
|---|---|---|---|
| 4,470,301 A | | 9/1984 | Hutchins et al. |
| 4,512,882 A | * | 4/1985 | Fischer .............. B01D 17/0214 |
| | | | 210/86 |
| 4,638,305 A | | 1/1987 | Sutton |
| 5,213,682 A | | 5/1993 | Richardson |
| 5,216,409 A | | 6/1993 | Ament et al. |

(Continued)

FOREIGN PATENT DOCUMENTS

| | | |
|---|---|---|
| DE | 102007031382 A1 | 1/2009 |
| DE | 102008043197 A1 | 4/2010 |

(Continued)

OTHER PUBLICATIONS

PCT International Search Report and Written Opinion from International Application PCT/US2014/048861, dated Nov. 12, 2014, 14 pages.

(Continued)

*Primary Examiner* — Lisa M Caputo
*Assistant Examiner* — Alex T Devito
(74) *Attorney, Agent, or Firm* — Tucker Ellis LLP; Michael G. Craig

(57) ABSTRACT

A filter device including a probe where a filter element probe first end selectively engages with a sensing unit located in a filter head and a filter element probe second end is located in a contaminant portion of a filter canister. The probe fixedly engages through the filter element utilizing a sealing component. The filter element is disposed in the filter canister that engages with the filter head.

15 Claims, 5 Drawing Sheets

(56) References Cited

U.S. PATENT DOCUMENTS

| | | | |
|---|---|---|---|
| 5,879,543 A | 3/1999 | Amini | |
| 6,248,236 B1 | 6/2001 | Hodgkins | |
| 6,852,217 B2 | 2/2005 | Jokschas et al. | |
| 7,368,060 B2 | 5/2008 | Faxides | |
| D588,935 S | 3/2009 | Richardson et al. | |
| 7,574,899 B2 | 8/2009 | Minott et al. | |
| 2001/0004061 A1 | 6/2001 | Popoff et al. | |
| 2003/0158635 A1* | 8/2003 | Pillar | A62C 27/00 701/1 |
| 2006/0157421 A1 | 7/2006 | Faxides | |
| 2010/0117842 A1 | 5/2010 | Fachidis | |
| 2011/0259088 A1 | 10/2011 | Fisher et al. | |
| 2011/0284448 A1 | 11/2011 | Dewes | |

FOREIGN PATENT DOCUMENTS

| | | |
|---|---|---|
| DE | 102011078362 A1 | 1/2013 |
| EP | 0863788 B1 | 7/2003 |

OTHER PUBLICATIONS

PCT International Preliminary Report on Patentability, International Application PCT/US2014/048861, dated Feb. 25, 2016, 10 pages.
Extended European Search Report for EP Application No. 14836485.4, dated Apr. 4, 2017, 9 pages.

\* cited by examiner

FUEL FILTER DEVICE

CROSS-REFERENCE TO RELATED APPLICATIONS

This application is a continuation of, and claims priority to, U.S. Ser. No. 13/965,583, entitled FUEL FILTER DEVICE, filed Aug. 13, 2013, which is now soon to be issued U.S. Pat. No. 9,522,353, which is incorporated herein by reference.

BACKGROUND

In general, automobiles, boats, ships, industrial vehicles, construction vehicles and other transportation vehicles incorporate a filter device. The filter device sometimes has a sensor or system for indicating the degree of contamination, the timing for replacing a filter or timing of renewal of contaminated oil thereby preventing occurrence of problems or issues in the vehicle engine, hydraulic system, etc.

Many of these prior art devices detect water or contamination after damage to the engine or engine shutdown has already occurred. In addition, many prior art contamination sensors are located on the outside of a filter canister which exposes them to debris and damage, for example when the filter is located in a wheel well.

Water in the fuel, for example if not detected quickly enough could result in the failure of the engine at a critical time in the operation of a vehicle.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

The instant invention relates to a water or contaminant detection filter suited for use in connection with fuel supply systems, hydraulic systems and where the presence of water in a fuel or fuel mixture may cause loss of power when needed or damage to an engine.

The sensing instrumentalities of the instant invention are of a form which will minimize possible damage the engine and in turn provide for actuation of a sensing circuit located in the filter device. The instant invention provides the convenience, safety, and reliability of a spin on metal filter.

BRIEF DESCRIPTION OF THE DRAWINGS

What is disclosed herein may take physical form in certain parts and arrangement of parts, and will be described in detail in this specification and illustrated in the accompanying drawings which form a part hereof and wherein.

DETAILED DESCRIPTION

Figure 1:
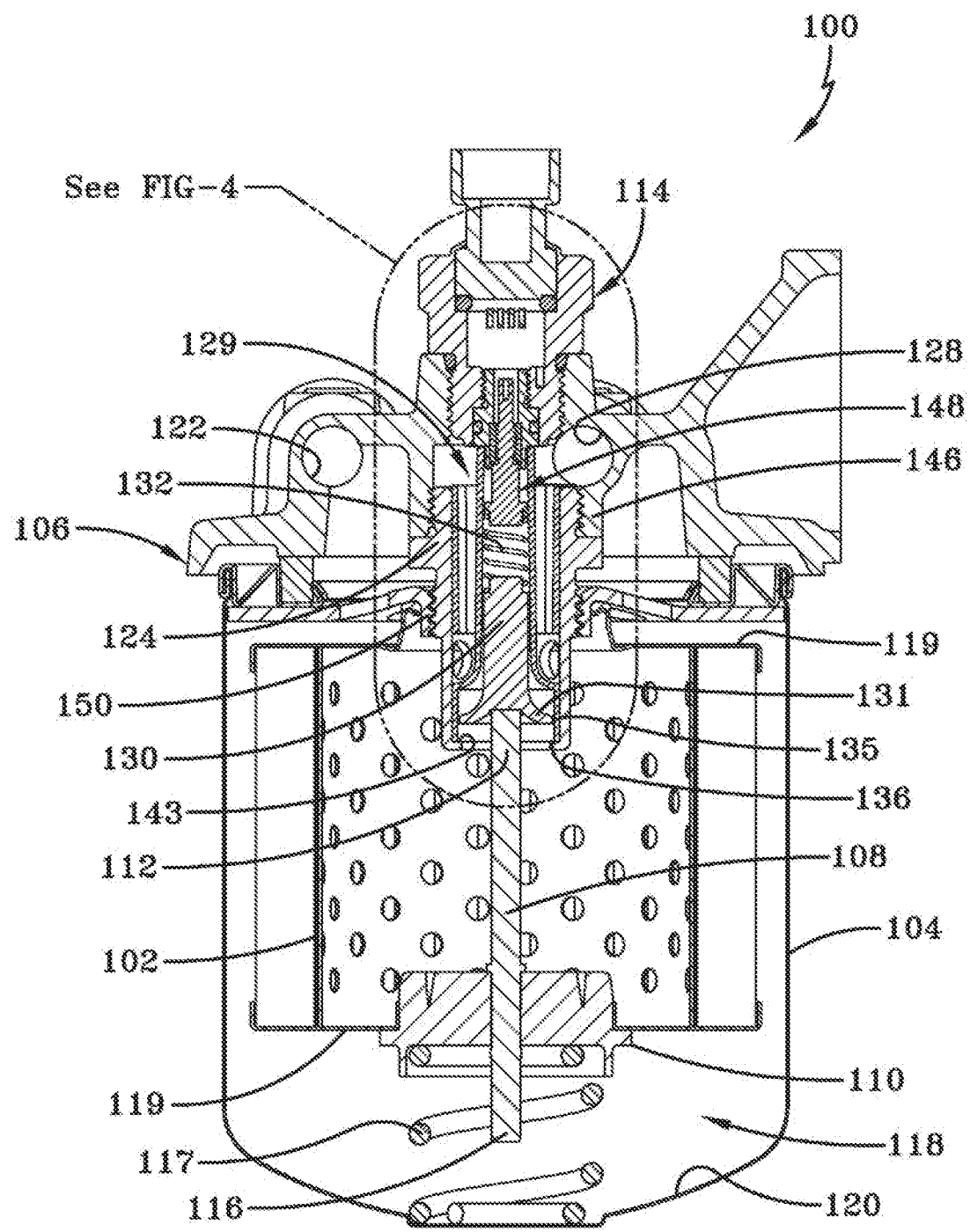
FIG. 1 is a cross sectional side view of an exemplary filter device enclosing a filter element with a probe, where a probe first end is constructed to selectively engage with a sensing unit, a probe second end is disposed in a contaminant receiving portion of a filter canister and the filter canister is attached to the fuel filter head.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices may be shown in block diagram form in order to facilitate describing the claimed subject matter.

Figure 2:
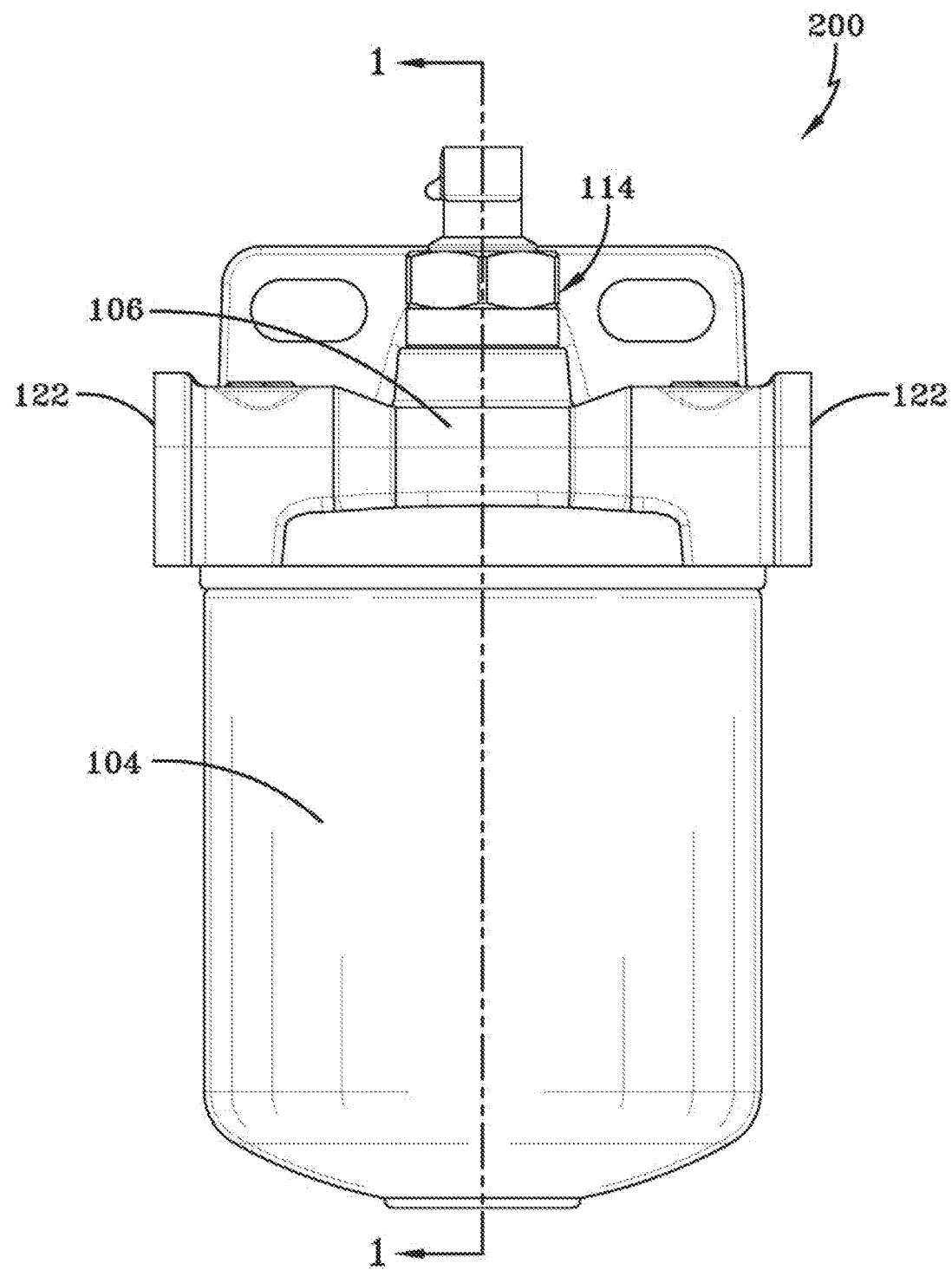
FIG. 2 is a side view illustrating the exemplary filter device illustrated in FIG. 1 attached to the fuel filter head.
Figure 3:
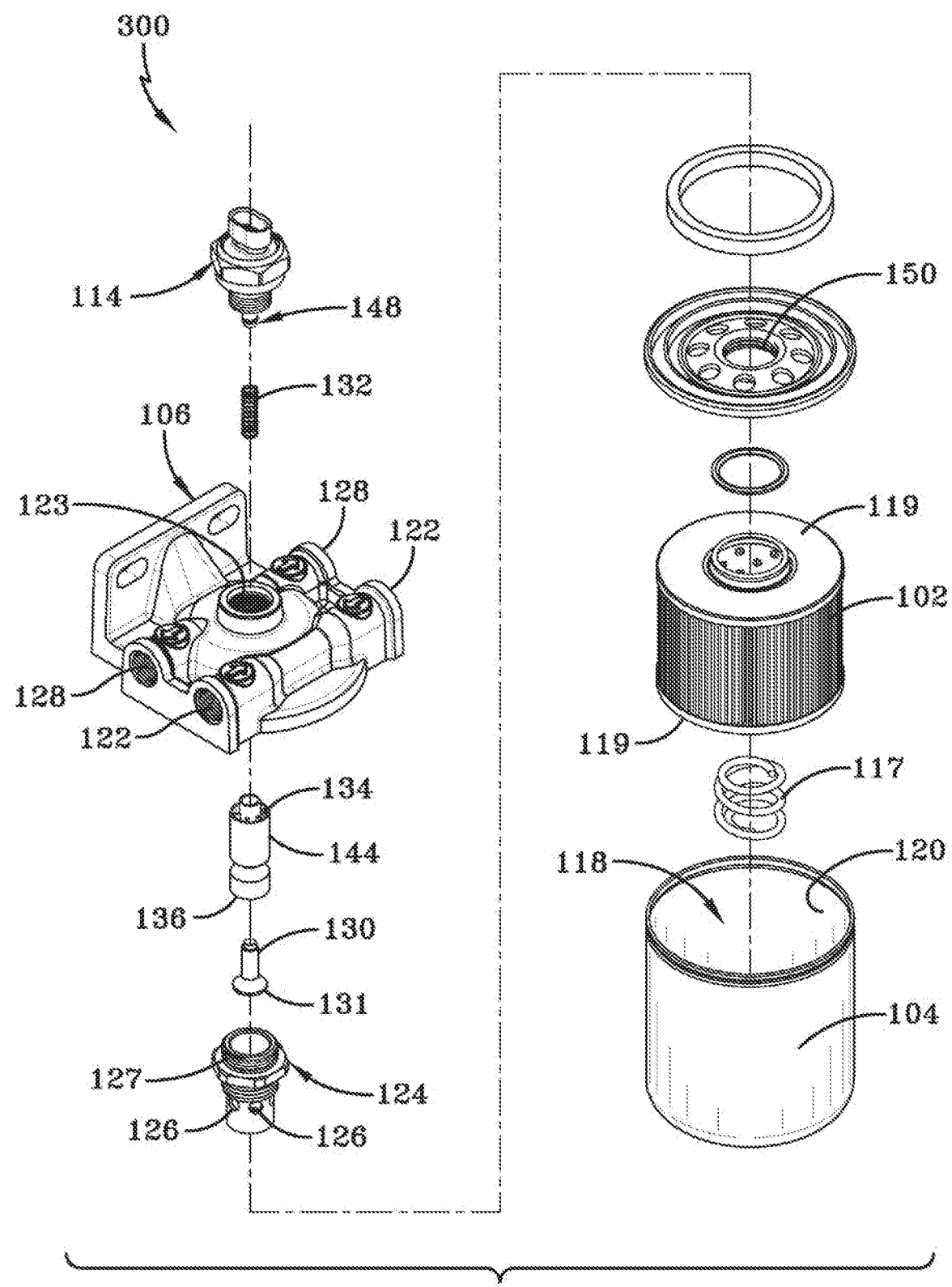
FIG. 3 is an exploded view of FIG. 2 illustrating an exemplary arrangement of the essential parts of the filter device in relation to one another.

Referring now to the drawings and particularly to FIGS. 1-3 illustrated in FIG. 1 is a cross-sectional side view of an exemplary filter device 100. FIGS. 2-3 illustrate a side view of the exemplary filter device 200 and an exploded view of the exemplary filter device 300, respectively. The filter device 100 comprises a filter element 102 that is arranged within a filter canister 104 (FIG. 2) to block a contaminant, for example, water within a fuel or mixture. The filter element 102 within the filter canister 104 is threaded, sealedly or non-sealedly engaged with a filter head 106, for example. The filter element 102 is non-fixedly sealedly engaged with a filter head 106 utilizing a filter element compression spring 117. Although this embodiment utilizes the filter element compression spring 117, other elements known by those of skill in the art are contemplated herein. A probe 108 fixedly or non-fixedly engages with the filter element 102 through a sealing component 110. The probe 108 comprises a probe first end 112 that is configured to selectively engage a sensing unit 114 (shown within the dashed oval) attached to the filter head 106. A probe second end 116 is disposed or located in a contaminant receiving portion 118 of the filter canister 104.

The probe second end 116 is located to electrically couple the sensing unit 114 when water is detected within the contaminant receiving portion 118 of the filter canister 104. An interior of the canister 120 comprises an electrically conductive material that is utilized to electrically couple with the sensing unit 114 when the filter canister 104 is selectively engaged with the filter head 106.

The filter element 102 comprises an end cap 119 where the end cap 119 defines a bottom end of the filter element 102 and the end cap 119 defines a top of the contaminant receiving portion 118 of the filter canister 104. The bottom interior wall of the interior of the canister 120 below the end cap 119 defines the bottom and sides of the contaminant receiving portion 118. The probe 108 is sealedly engaged with the sealing component 110 fixedly or non-fixedly connected with the filter element end cap 119.

Thus, for example if fuel or a mixture within the contaminant receiving portion 118 contains water, as soon as the water reaches the probe second end 116, the sensing unit 114 will sense a reduced electrical resistance and complete a circuit for sensing and signaling purposes. The sensing unit 114 determines a reduced electrical resistance between the probe second end 116 and the electrically conductive interior of the canister 120, for example, sensing the lower resistive through water as compared with diesel fuel.

Figure 4:
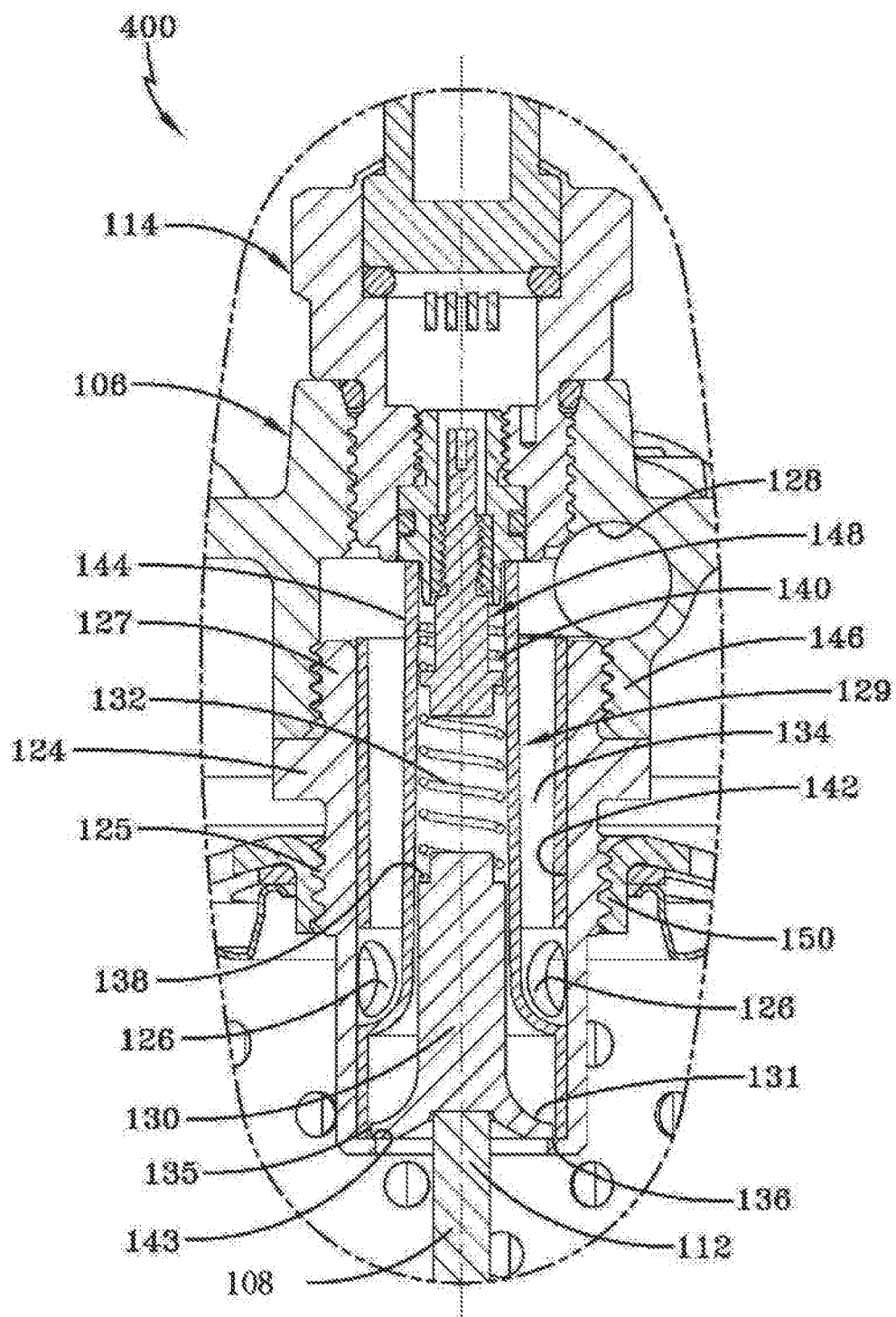
FIG. 4 is a cross-sectional view of a spud and sensor assembly.
Figure 5:
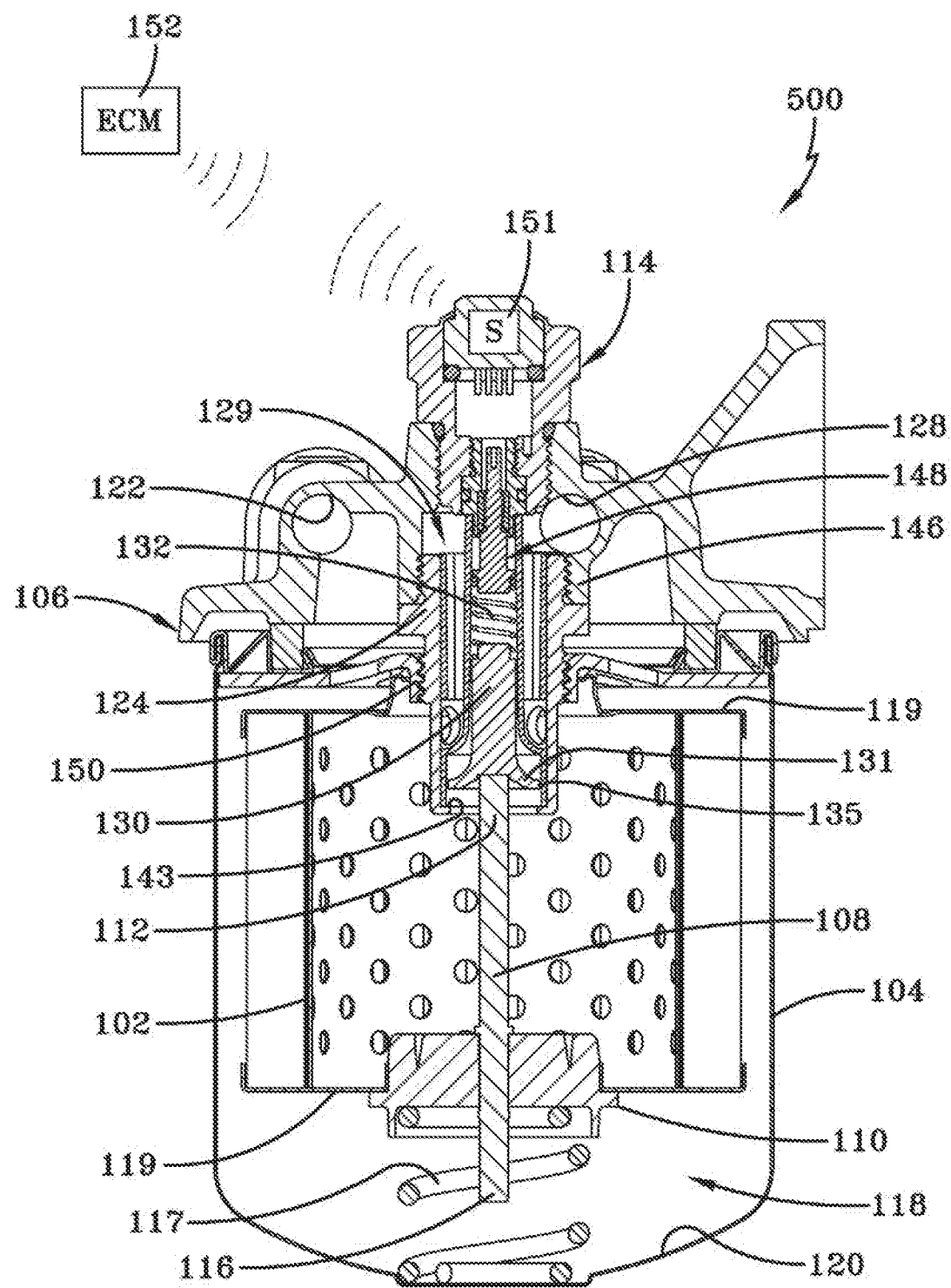
FIG. 5 is a side view illustrating an exemplary filter device attached to the fuel filter head where a wireless sensor and signal communicator wirelessly communicates with an electronic control module.

The filter head 106 comprises inlet ports 122, a threadably engaged electrically conductive spud assembly 123 with a spud 124 having side openings 126 providing mixture flow access to the outlet ports 128. A threaded spud end 127 threadedly engages with the filter head threaded opening 146 (FIG. 4). A threaded spud center portion 125 threadedly engages with a canister top plate threaded opening 150. A spring/touch plug assembly 129 comprises an electrically conductive touch plug 130, a conductive spring 132, an insulated spring capsule 144 and a sensor wire assembly 148. The probe first end 112 is configured to engage the electrically conductive touch plug 130 that is slidably disposed within the insulated spring capsule 144 located within the spud 124, wherein the touch plug 130 is biased by the spring 132 toward the probe first end 112, when the filter canister 104 is selectively engaged with the filter head 106 (See e.g., FIG. 4). The electrically conductive touch plug 130 can comprise brass, stainless steel and the like. The compression spring 132 acts as a conductor between the touch plug 130 and the sensor wire assembly 148. The mixture or fuel within the filter canister 104 is in communication with the mixture outlet ports 128 by passing through the multiple spud side holes 126, and a defined passageway 134 within the insulated spring capsule 144. The insulated spring capsule 144 can be a molded component, for example. The insulated spring capsule materials comprise fuel resistant polymers, fuel resistant composites, metals and the like.

The conductive touch plug 130 is disposed in contact with the conductive spud 124 when the probe first end 112 is not selectively engaged with the touch plug 130. (e.g., a filter without a probe is attached to the filter head 106). A touch plug first end outer lip 131 comes into contact with a spud inner lip 143 creating a touch off point 136. In this situation the sensing unit 114 determines electrical contact between the spud 124 and the touch plug 130, for example that indicates the lack of a probe in a filter device. The touch plug 130 is not in contact with the spud 124 (i.e., isolated by an insulated spring capsule 144, see FIG. 4) when the probe first end 112 is selectively engaged with the touch plug 130 which overcomes the bias force of the spring 132 and moves the touch plug 130 away from contact with the spud 124. The touch plug 130 and the spring 132 are retained within the insulated spring capsule 144 positioned between the spud inner surface 142 and the touch plug 130. A spring first end 138 is attached to and restrained by a second end of the touch plug 151 as illustrated in FIG. 4 and a spring second end 140 is attached to the sensor wire assembly 148, as illustrated.

In one aspect, the exemplary filter device (e.g., 100, 200, 300 of FIGS. 1, 2 and 3, respectively) may be used to filter an undesired contaminant from a desired constituent. For example, the exemplary filter device may be configured to be used in a fuel-water separator, where water mixed with a fuel supply can be filtered out, resulting in an output of fuel comprising less water.

In one implementation, in this aspect, the exemplary filter device may be disposed in a filter canister (e.g., 104 of FIG. 1). As one example, the combined filter device and filter canister may comprise a disposable filter unit, selectively engaged with a filter head (e.g., 106 of FIG. 1), which, in turn, is configured to receive a (potential) mixture of the desired constituent (e.g., fuel) and undesired contaminant (e.g., water). Further, in this example, the filter head may be configured to output the desired constituent mixed with less of the undesired contaminant when the disposable filter unit is selectively engaged.

In one implementation, the disposable filter unit can comprise a contaminant receiving portion (e.g., 118), that may be configured to receive and store the undesired contaminant. As an example, when the contaminant is removed from the constituent mixture is may collect in the contaminant receiving portion of the disposable filter unit, where it can be stored apart from the mixture filtering portion of the disposable filter unit. That is, for example, water filtered from a fuel-water mixture or mixture may collect in a bottom portion of the filter canister, where is can be stored, and can remain separate from the mixture and/or the filtered fuel. In one implementation, the contaminant can be drained from the storage area, such as through a coupled drain port. In another implementation, the entire filter may be removed and replaced when the contaminant area is full.

In this aspect, in one implementation, the filter device can comprise a probe (e.g., 108) that is fixedly disposed in the filter device, such as through an end cap (e.g., 119) engaged with a filter element (e.g., 102) of the filter device. As an example, the end cap may comprise a sealing device (e.g., 110), such as a disk, gasket, polymer or rubber grommet, or the like, that is configured to fixedly engage with the probe, while being fixedly engaged with the end cap. In this way, in this example, a second end of the probe (e.g., 116) may be disposed through the end cap into the contaminant receiving portion of the disposable filter unit, while still maintaining a leak resistant barrier between the contaminant receiving portion and the filtered fuel.

In one implementation, in this aspect, the second end of the probe may be disposed in the contaminant receiving portion of the disposable filter unit at a point that corresponds to a desired filter change level. That is, for example, when the contaminant in the contaminant receiving portion reaches the second end of the probe, the contaminant receiving portion may comprise sufficient contaminant to indicate that the filter should be changed out with a new filter, and/or the contaminant receiving portion should be emptied of the contaminant, so that the filtering operations are not compromised (e.g., the contaminant overflows into the filtering operation). As an example, the level in the contaminant receiving portion at which the second end of the probe may be disposed may depend on a size and volume of the contaminant receiving portion, and/or an expected fill rate of the contaminant receiving portion.

In one implementation, a first end of the probe (e.g., 112) may be disposed at a distal end from the second end, and may be configured to selectively engage with a touch plug (e.g., 130, disposed in the filter head), such as when the filter unit is selectively engaged with the filter head. In this implementation, the first end and second end of the probe are electrically connected. In this implementation, the touch plug can be comprised in a touch plug assembly (e.g., 129), which is electrically connected with a sensor coupling unit (e.g., operably or communicatively engaged with a sensor). Therefore, for example, a sensor 151 may be communicatively (e.g., wired or wirelessly) or operably coupled with the first end of the probe 112, which is further operably coupled with the second end of the probe 116. In this way, for example, when the contaminant reaches the level of the second end of the probe 116, the wireless sensor and signal communicator 151 may be communicatively or operably coupled with the contaminant. The wireless sensor and signal communicator 151, selectively engaged with the filter head 106 and electrically coupled with an ECM 152.

In another implementation, sensor may be operably coupled with a user indicator, for example, configured to indicate to a user that the contaminant level in the filter has reached the desired change out level. That is, for example, when the contaminant fills the container to the level where it comes into contact with both the inside wall of the filter canister and the second end of the probe, the sensor may detect a change in electrical resistance, which may result in the user indicator being activated. In this way, the user may be able to identify when the filter needs to be changed, for example, by observing the user indicator (e.g., light, notice, sound, etc.).

Although the invention has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising."

The word "exemplary" is used herein to mean serving as an example, instance or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, at least one of A and B and/or the like generally means A or B or both A and B. In addition, the articles "a" and "an" as used in this application and the appended claims may generally be construed to mean "one or more" unless specified otherwise or clear from context to be directed to a singular form.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Of course, those skilled in the art will recognize many modifications may be made to this configuration without departing from the scope or spirit of the claimed subject matter.

What is claimed is:

1. A filter system, comprising:
   A filter head selectably receiving a filter device for filtering contaminants from a mixture received by the filter head, the filter head comprising:
   a contaminant sensor that detects a contaminant indicator signal; and
   a signal communicator electrically coupled with the contaminant sensor, the signal communicator communicatively coupling with a remote filter status unit; and
   the filter device comprising a filter and a probe fixedly coupled with a the filter in the filter device, the probe comprising an electrical conductor that electrically couples with the contaminant sensor merely when the filter device is operably engaged with the filter head, thereby electrically coupling the contaminant sensor with a contaminant collection area of the filter device;
   wherein the filter head further comprises a filter head spud that operably engages with the filter device, and the filter head comprises a touch plug that is disposed inside a first chamber in the filter head spud, wherein the touch plug is operably slidable inside the first chamber, and wherein the touch plug is operably spring biased toward a distal end of the filter head spud, and wherein the touch plug operably, electrically couples the contaminant sensor with the probe.

2. The system of claim 1, the signal communicator comprising a wireless signal communicator that uses a wireless connection to communicatively couple with the remote filter status unit.

3. The system of claim 1, the signal communicator comprising a wired signal communicator that uses a wired connection to communicatively couple with the remote filter status unit.

4. The system of claim 1, the remote sensor unit coupled with a user interface providing an indication of a contaminant level status in the filter device.

5. The system of claim 1, the probe comprising:
   a first end that contacts a touch plug end of the contaminant sensor merely when the filter device is engaged with the filter head; and
   a second end disposed in the contaminant collection area of the filter device.

6. The system of claim 5, the touch plug end slidably disposed in the filter head, and configured to slide into the filter head to create an electrical coupling between the contaminant sensor and the probe merely when the filter device is fully engaged with the filter head.

7. The system of claim 6, at least a portion of an interior of the shell comprising an electrically conductive material that is electrically coupled with the contaminant sensor by way of the probe when the filter device is engaged with the filter head.

8. The system of claim 7, the probe electrically coupling the contaminant sensor with the interior of the shell when the contaminant contacts the second end of the probe.

9. The system of claim 5, the filter device comprising an outer shell that holds fluids, the outer shell defining at least a portion of the contaminant collection area, and the second end of the probe defining another portion of the contaminant collection area.

10. The system of claim 1, the spud and touch plug respectively comprise electrically conductive material, and:
    the touch plug is in contact with the spud when the probe is not engaged with the touch plug; and
    the touch plug is not in contact with the spud when the probe is engaged with the touch plug.

11. The system of claim 10, the contaminant sensor generating a signal when the touch plug is electrically coupled with the filter head spud.

12. The system of claim 1, the filter head spud comprising a fluid passageway that allows fluid into the filter head spud.

13. The system of claim 1, the filter head spud comprises:
- a first chamber that houses the touch plug in a slidable disposition; and
- a second chamber in fluid communication with the fluid passageway at a proximal end of the filter head spud, the first chamber is electrically insulated from the second chamber.

14. The system of claim 1, the contaminant sensor comprising a water detection sensor that detects the presence of water.

15. The system of claim 1, the filter head comprising a filter head spud that operably engages with the filter device, and the outer shell comprising a shell cap disposed at its proximal end that is fixedly engaged with the filter, the shell cap comprising a spud engagement portion that selectably engages with the filter head spud.

* * * * *